United States Patent
Volodarsky et al.

(10) Patent No.: US 7,756,909 B2
(45) Date of Patent: Jul. 13, 2010

(54) CONFIGURATION PROFILES FOR OUTPUT CACHED PAGES

(75) Inventors: Michael D. Volodarsky, Seattle, WA (US); Fabio A. Yeon, Everett, WA (US); Robert Howard, Frisco, TX (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 11/117,860

(22) Filed: Apr. 29, 2005

(65) Prior Publication Data

US 2006/0248274 A1 Nov. 2, 2006

(51) Int. Cl.
  *G06F 17/30* (2006.01)
  *G06F 7/00* (2006.01)
(52) U.S. Cl. .................... 707/812; 709/220; 711/3; 711/118; 711/170
(58) Field of Classification Search .................. None
  See application file for complete search history.

(56) References Cited

U.S. PATENT DOCUMENTS

| | | | |
|---|---|---|---|
| 6,374,329 B1 * | 4/2002 | McKinney et al. | 711/141 |
| 6,757,708 B1 * | 6/2004 | Craig et al. | 709/203 |
| 7,069,271 B1 * | 6/2006 | Fadel et al. | 707/102 |
| 7,139,811 B2 * | 11/2006 | Lev Ran et al. | 709/217 |
| 7,145,898 B1 * | 12/2006 | Elliott | 370/352 |
| 2003/0070063 A1 * | 4/2003 | Boyle et al. | 713/2 |
| 2004/0255048 A1 * | 12/2004 | Lev Ran et al. | 709/249 |
| 2006/0168649 A1 * | 7/2006 | Venkat et al. | 726/5 |
| 2007/0174428 A1 * | 7/2007 | Lev Ran et al. | 709/218 |

* cited by examiner

*Primary Examiner*—Greta L Robinson
*Assistant Examiner*—James J Wilcox
(74) *Attorney, Agent, or Firm*—Merchant & Gould, P.C.

(57) ABSTRACT

Profiles hold cache settings externally from a requesting resource. The external cache settings stored within a profile may be associated with one or more resources. This allows the external cache settings for a group of resources to be managed from one location rather than having to change the internal cache settings for each resource. When a resource is processed by the server, the external cache settings are obtained from a cache profile and applied to the requesting resource. The external cache settings may also be merged with any internal resource settings. As a result of merging the settings some of the external cache settings and/or some of the internal cache settings may be overridden.

15 Claims, 4 Drawing Sheets

CONFIGURATION PROFILES FOR OUTPUT CACHED PAGES

BACKGROUND OF THE INVENTION

Caching is a technique widely used in computing to increase performance by keeping frequently accessed or expensive data in memory. In the context of a Web application, caching is used to retain pages or data across HTTP requests and reuse them without the expense of having to recreate them. Many different types of caching exist, such as output caching, fragment caching and data caching. Output caching caches the dynamic response generated by a request. Fragment caching caches portions of a response generated by a request. Data caching caches arbitrary objects programmatically.

Output caching is a mechanism for reusing page responses for multiple requests to the same page in order to avoid performing expensive processing on every request. During the time a page is cached by the output cache, subsequent requests for that page are served from the output cache without processing the code that created it. In output caching, each page specifies settings within the page that define whether and how the page is cached. These settings include items such as: cache duration, how multiple variants are constructed based on client input, and various settings controlling proxy and client caching of the returned response. Discovering and managing these settings requires each page to be inspected individually, which quickly becomes a problem on sites with tens or hundreds and more pages.

SUMMARY OF THE INVENTION

Briefly stated, embodiments of the present invention are related to associating externally stored cache settings with resources.

According to one aspect of the invention, cache settings associated with one or more resources are stored externally from the resource itself within a profile (the "external cache settings.") When a resource is processed, the external cache settings are obtained from a configuration profile and applied to the requesting resource.

According to another aspect of the invention, the external cache settings are merged with resource settings contained within the resource itself (the "internal cache settings.") As a result of merging the settings some of the external cache settings and/or some of the internal cache settings may be overridden.

According to yet another aspect of the invention, the external cache settings may be managed outside the resource itself. For example, a configuration manager could configure the external cache settings in a central location outside of the code for each resource thereby affecting the cache settings for one or more resources by changing a single profile file. This helps in managing and configuring potentially thousands of resources.

DETAILED DESCRIPTION OF THE PREFERRED EMBODIMENT

Embodiments of the present invention are related to associating externally stored cache settings with resources. The external cache settings stored within a profile may be associated with one or more resources. This allows the external cache settings for a group of resources to be managed from one location rather than having to change the internal cache settings for each resource. When a resource is processed by the server, the external cache settings are obtained from a cache profile and applied to the requesting resource. The external cache settings may also be merged with any internal resource settings. As a result of merging the internal and external cache settings some of the external cache settings and/or some of the internal cache settings may be overridden.

Caching System Utilizing Configuration Profiles

Figure 2:
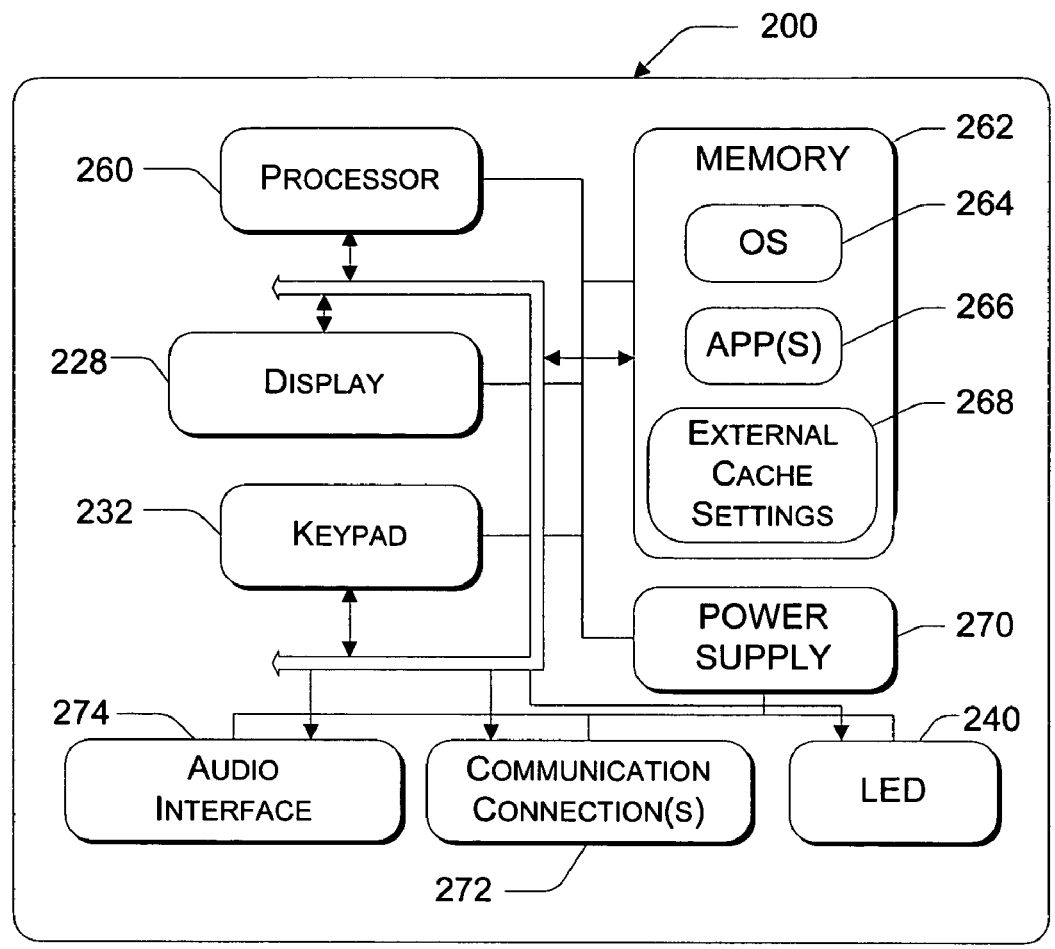
Figure 3:
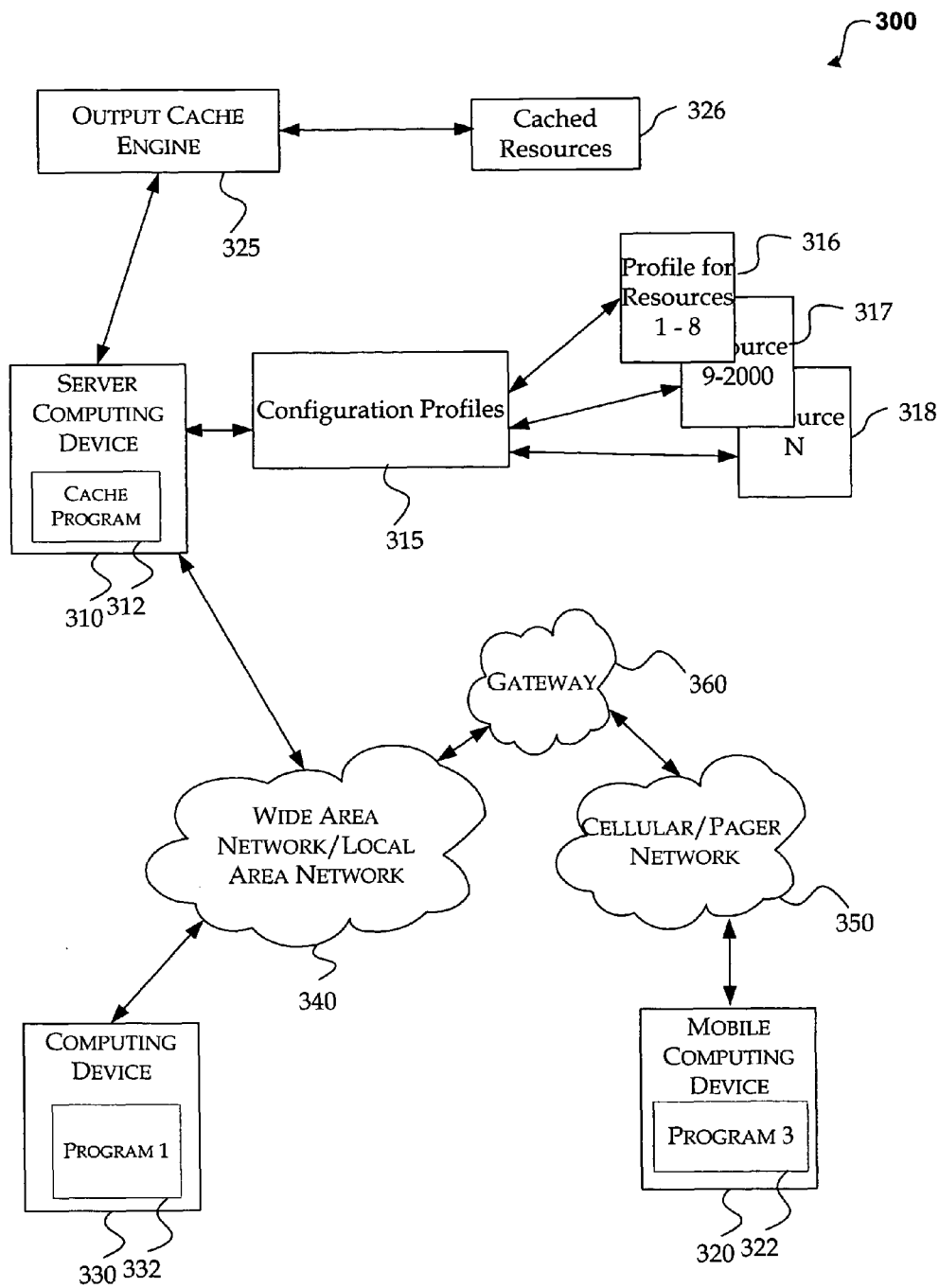
FIG. 3 is a functional block diagram illustrating a caching system utilizing configuration profiles.

FIG. 3 is a functional block diagram generally illustrating a caching system utilizing configuration profiles, in accordance with aspects of the invention. As illustrated, system 300 includes server 310, output cache engine 325, cached resources 326, configuration profiles 315 that includes individual profiles 316, 317, and 318, client computing devices 320 and 330. Server 310 and computing device 330 are computing devices such as the one described in conjunction with FIG. 1 and mobile device 320 is a mobile computing device such as the one described in conjunction with FIG. 2.

Server 310 is configured to run cache program 312. Cache program 312 is configured to receive requests from clients 320 and 330. Data may be transmitted between the computing devices and the server over a wide area network (WAN)/local area network (LAN) 340 and or cellular/pager network 350.

Generally, programs (322 and 332) may generate a request to server 310 for an update associated with a resource. For example, program 1 (332) could be a browser application that is requesting a page update for a website the user is visiting. When the request is received, output cache engine 325 determines whether the request may be satisfied from cached resources 326. When the response to the request is cached, output cache engine 325 returns the cached entry to the requesting device without the server having to process the request. When the request may not be satisfied from the cache, the request is processed by server 310.

Cache program 312 accesses the external cache settings associated with the requested resource from one of the configuration profiles stored by configuration profiles 315. In the present example, the cache settings relate to a web page. Once the request is processed, the page is stored within the cache (if eligible) according to the external cache settings stored within the configuration profile that is associated with the resource, as well as any cache settings stored within the resource itself (the "internal cache settings").

A single configuration profile may apply to one or more resources. As illustrated, profile 316 includes cache settings for resources 1-8, profile 317 includes cache settings for resources 9-2000, and profile 318 includes cache settings for resource N. Profiles may be associated with any number of resources. Management of cache settings becomes much easier when the cache settings may be configured externally from the resource itself. For example, making a change to a cache setting may be made within the configuration profile rather than having to individually change each resource that points to the configuration profile.

Cache program 312 merges the internal cache settings with the external cache settings stored within the configuration profiles 315. According to one embodiment, the internal cache settings have a higher priority than the external cache settings. Any priority scheme, however, may be implemented. For example, some internal cache settings may have a higher priority than the external cache settings whereas some external cache settings may have a higher priority than internal cache settings.

According to one embodiment, the external cache settings are used for output caching. Output caching may also be thought of as page level caching that is especially useful for static web pages. According to another embodiment, the external cache settings may be used for any type of caching.

The external cache settings enable resources to inherit their cache settings from a profile within configuration profiles 315 that is defined in a central location. Storing the cache settings in a central location dramatically improves the manageability of cache settings that otherwise would be defined individually by and on each page. Multiple pages that share common cache settings may be reconfigured by modifying a single line of configuration within the profile instead of finding and changing each page individually. Individual pages can also selectively override external cache profile settings as required. According to one embodiment, the external cache settings include a "cache enabled" setting that may be turned on and off to control the caching of the affected pages without ever having to modify the pages. These cache settings are also easily editable using tools that leverage standard configuration APIs. Cache settings may also be reused by allowing the page developer to simply select a profile from the configuration profiles instead of having to define all settings within each page. Individual settings defined within the page, as well as profile overrides, are also possible to enable customizing general profiles on a per-page basis.

According to one embodiment, the external cache settings stored within the configuration profiles (315) are stored as XML. Each cache profile (316, 317 and 318) is a named set of cache settings and contains the settings that are definable on page level. The following is an illustration of configuring a few cache settings using XML:

```
<outputCacheSettings>
  <outputCacheProfiles>
    <add name="MyCacheProfile" enabled="true"
    duration="100"
    diskCacheable="true" location="Any"
    varyByParam="none" noStore="false" />
  </outputCacheProfiles>
</outputCacheSettings>
```

The example above includes the name of the output profile "MyCacheProfile", an indication that they the page is cache enabled, the duration of time the page should be cached (100 seconds), that the page is disk cacheable and may be cached at any available location (i.e. on the server, on the client, at a proxy, and the like), and that the page does not vary by parameter and the page may be stored.

According to one embodiment, each individual page can refer to an external cache profile by specifying the CacheProfile attribute in the <%@OutputCache %>directive included within the page. For example, referring to the cache profile defined in the example above would be: <%@OutputCache CacheProfile="MyCacheProfile" VaryByParam="page" %>.

In addition, as shown above, the directive can explicitly specify internal cache settings for some of the settings in order to override the external cache values inherited from the profile. According to one embodiment, the cache enabled setting cannot be overridden at the page level, thereby allowing the administrator to be able to turn the cache on and off for all pages using a profile.

When processing the request, the server accesses the page and loads the settings from the specified profile and overrides any of the conflicting settings with settings specified directly in the OutputCache directive contained within the page. The page then enforces that the settings have been specified by either the profile or the directive. The settings are then be used to control the output cache behavior of the page response.

The following example illustrates caching responses for 1 minute, caching them only on the server and varying the caching by browser.

```
<outputCacheSettings>
  <outputCacheProfiles>
    <add name="ServerOnly" Duration="60"
    VaryByCustom="browser"
    Location="Server" />
  </outputCacheProfiles>
</outputCacheSettings>
```

The page using the above profile includes the following directive: <%@OutputCache CacheProfile="ServerOnly" %>.

The page is now configured to be output cached with the settings specified in the "ServerOnly" profile. Now suppose that it has been determined that the pages should be cached for a longer period of time than 60 seconds. To make the change, the only change that is made is to the ServerOnly cache profile. A single change in the Duration value of the ServerOnly cache profile automatically applies this change to all the pages scattered across the application that are pointing to this profile. Additionally, some pages in the application may need to vary cache settings to insure the correctness of the served output. An individual page/control can specify additional settings in the OutputCache directive, adding or overriding the settings specified in the profile. For example: <%@OutputCache CacheProfile="ServerOnly" Duration=30 VaryByParam="mySpecialParam" %>. This directive uses the ServerOnly profile but overrides the duration to be 30 seconds and adds the VaryByParam parameter.

According to one embodiment, a default profile may be configured. When a default profile is utilized the individual pages do not need to include the name of an output cache profile. Instead every resource is by default associated with the default profile.

Cache settings may also be configured for debugging purposes. For example, a customer may disable cache settings by simply naming the profile "Disabled" or an existing profile may be modified to disable output cache for pages pointing to it, without having to touch pages by setting enabled to "false." The following are some exemplary cache settings that may be stored within a profile.

The <outputCacheSettings> element specifies output cache settings that can be applied to pages/controls in the application, and can be defined at any level. The following is an XML example of the output cache settings section.

```
<outputCacheSettings >
  <outputCacheProfiles>
    <add name="[string]" enabled="[bool]" />
  </outputCacheProfiles>
  <fragmentCacheProfiles>
```

```
    <add name="[string]" enabled="[bool]" />
  </fragmentCacheProfiles>
  />
</cacheSettings>
<scaching>
```

The <outputCacheProfiles> element contains groups of cache settings that can be applied to pages specifying the OutputCache directive. Each OutputCache directive can specify a CacheProfile attribute, which points to one of the profiles available in the configuration. The OutputCache directive can specify any of the settings available to each profile and they will override the ones specified in the profile.

The <fragmentCacheProfiles> element contains groups of cache settings that can be applied to user controls specifying the OutputCache directive. This is similar to the <outputCacheProfiles>.

Cellular/pager network 350 is a network responsible for delivering messages to and receiving messages from wireless devices. The cellular/pager network 350 may include both wireless and wired components. For example, cellular/pager network may include a cellular tower that is linked to a wired telephone network. Typically, the cellular tower carries communication to and from cell phones, long-distance communication links, and the like.

Gateway 360 routes messages between cellular/pager network 350 and WAN/LAN 340. For example, a computer user may send a message that is addressed to a cellular phone. Gateway 360 provides a means for transporting the message from the WAN/LAN 340 to cellular/pager network 350. Conversely, a user with a device connected to a cellular network may be browsing the Web. Gateway 360 allows hyperlink text protocol (HTTP) messages to be transferred between WAN/LAN 340 and cellular/pager network 350.

Figure 4:
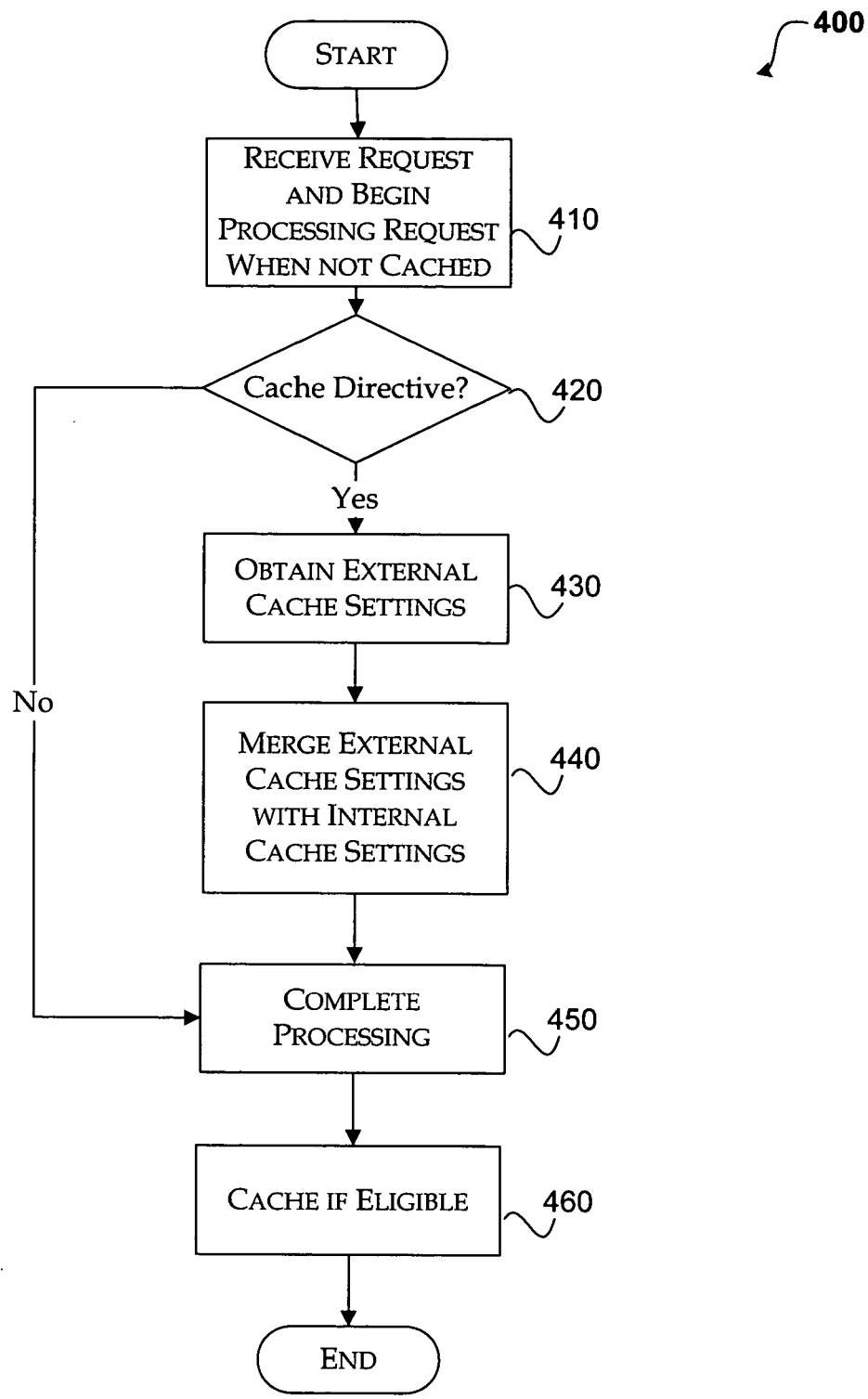
FIG. 4 illustrates a process for associating external cache settings with a resource, in accordance with aspects of the present invention.

FIG. 4 illustrates a process for associating external cache settings with a resource, in accordance with aspects of the present invention.

After a start block, the process flows to block 410 where the request is received and the processing of the request is begun when the request may not be satisfied by an entry within the cache.

Moving to block 420, a determination is made as to whether the request includes a cache directive. The cache directive indicates whether, and under what conditions, an attempt should be made to cache the request after it has been processed. When the request is not to be cached the process moves to block 450 where the processing of the request is completed. When the request includes a directive to cache the request, the process flows to block 430 where the external cache settings are obtained for the resource. As discussed above, the same external cache settings may be applied to one or more resources.

Flowing to block 440, the internal cache settings are merged with the external cache settings. According to one embodiment, the internal cache settings override the external cache settings. As discussed above, other priority schemes may be implemented.

The process then flows to block 450 where the request of the processing is completed. Moving to block 460, the request is cached when it is eligible. The process then moves to an end block, and returns to processing other actions.

Illustrative Operating Environment

Figure 1:
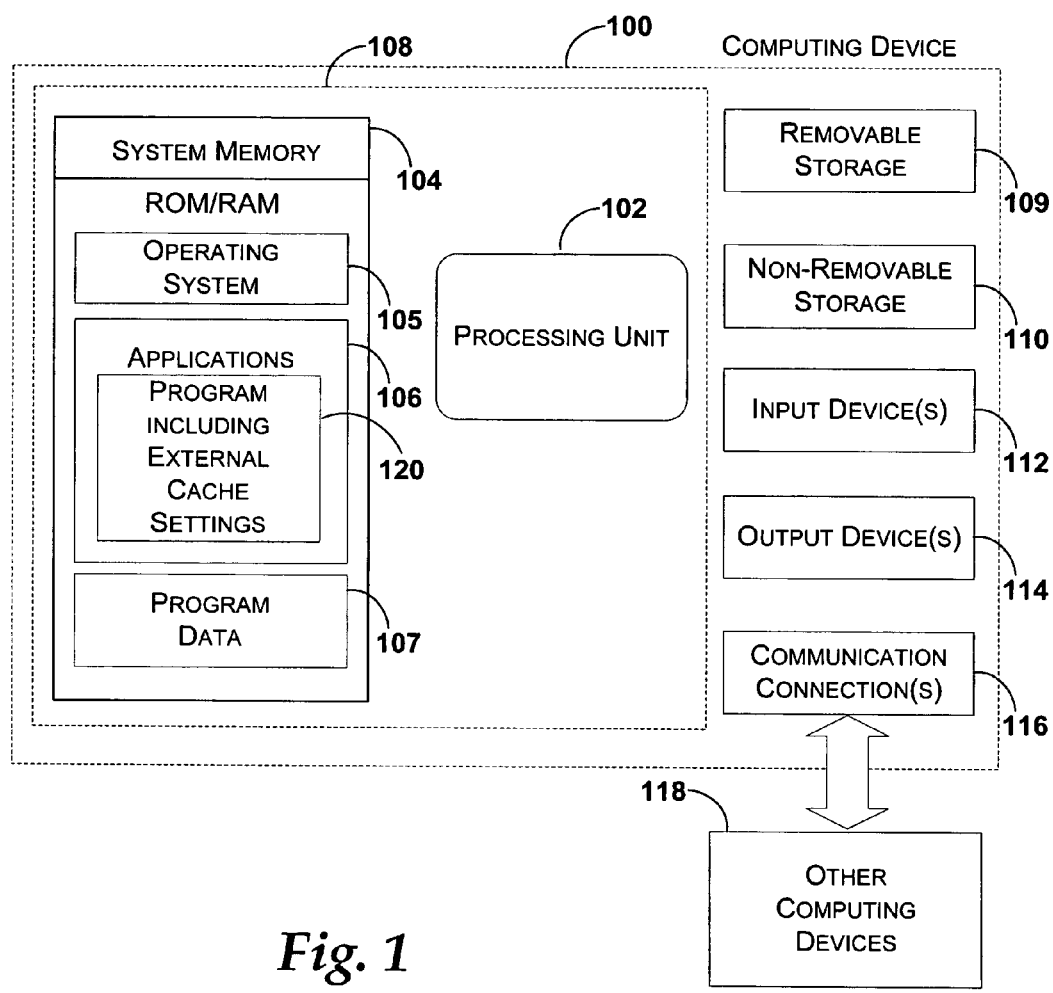
FIGS. 1 and 2 illustrate exemplary computing devices.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a program 120 that utilizes external cache settings. In another embodiment, application 106 may be a cache program that interacts with external cache settings when computing device 100 is configured as a server. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. Application 268 resides on mobile computing device 200 and is programmed to utilize external cache settings. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. According to one embodiment, transmissions to and from communications connection 272 are conducted under control of the operating system 264.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for associating cache settings with a resource, comprising:

receiving a request that relates to a resource; wherein the resource specifies a configuration profile that is stored externally from the resource and comprises external cache settings for the resource, wherein the external cache settings comprise settings on how and when to cache the resource within a cache;

after receiving the request that relates to the resource obtaining the external cache settings for the resource from the configuration profile specified by the resource;

obtaining internal cache settings specified directly by the resource and obtaining the external cache settings for the resource from the configuration profile; wherein the configuration profile provides for external configuring of caching behavior for the resource and other resources using the same external cache settings; wherein the external cache setting describes the caching of a dynamic response that is generated by a server in response to the received request is cached; and merging the external cache settings with internal cache settings, wherein the internal cache settings are stored with the resource; wherein the external cache settings include setting at least one of the following: a duration and an enablement of caching.

2. The method of claim 1, wherein merging the external cache settings with the internal cache settings comprises overriding the external cache settings when there is a conflict between a corresponding internal cache setting and one of the external cache settings.

3. The method of claim 1, wherein the caching is output caching.

4. The method of claim 1, further comprising managing the external cache settings from a central location.

5. The method of claim 1, wherein associating the external cache settings with the resource further comprises associating the external cache settings with a set of resources.

6. A computer-readable storage medium having computer-executable instructions for associating cache settings with a resource, comprising:

determining external cache settings that are associated with a resource; wherein the external cache settings control output caching of the resource; and wherein the resource is a dynamic response that is generated by a server; wherein the resource specifies a configuration profile that is stored externally from the resource and comprises the external cache settings for the resource, wherein the cache settings specify how and when to cache the resource within a cache;

associating the external cache settings with the resource in response to determining external cache settings that are associated with the resource, wherein the external cache settings are used in configuring caching behavior for the resource such that the profile is located external with respect to the resource of which the profile controls the output caching settings; wherein the external cache setting defines the manner in which a dynamic response is cached external to the resource; wherein the resource comprises internal cache settings specified directly by the resource and are used together with the external cache settings and wherein the configuration profile is used for the resource and other resources: and merging the external cache settings with internal cache settings, wherein the internal cache settings are stored with the resource; wherein the external cache settings include setting at least one of the following: a duration and an enablement of caching.

7. The computer-readable medium of claim 6, wherein merging the external cache settings with the internal cache setting comprises overriding the external cache settings when there is a conflict between a corresponding internal cache setting and a external cache setting.

8. The computer-readable medium of claim 6, wherein merging the external cache settings with the internal cache setting comprises overriding the internal cache settings when there is a conflict between a corresponding internal cache setting and a external cache setting.

9. The computer-readable medium of claim 6, wherein the caching is output caching.

10. The computer-readable medium of claim 6, further comprising managing the external cache settings stored within the profile from an application programming interface.

11. The computer-readable medium of claim 6, wherein associating the external cache settings with the resource further comprises associating the external cache settings with a group of resources.

12. A system for associating cache settings with a resource, comprising:
- a configuration profile comprising external cache settings that relate to more than one resource that is server generated in response to a request; wherein the external cache settings are located externally from the more than one resource to which they relate; wherein the configuration profile includes external cache settings relating to the request for the resource; wherein the resource directly specifies internal cache settings that are stored with the resource;
- a client that is configured to access a network and that includes an application that is configured to perform actions, including:
  - making a request that is associated with the resource; and
- a server that is configured to access the network and that includes a program that is arranged to perform actions, including:
  - receiving the request;
  - accessing the configuration profile that is associated with the request and associating the external cache settings with the resource; wherein the external cache settings describes the manner in which a dynamic response that is generated by the server in response to the request received from the client is cached on the server; and
  - merge the external cache settings with internal cache settings; wherein the external cache settings include setting at least one of the following: a duration and an enablement of caching.

13. The system of claim 12, wherein merging the external cache settings with the internal cache setting comprises overriding the external cache settings when there is a conflict between one of the internal cache settings and one of the external cache settings.

14. The system of claim 12, further comprising a managing computing device configured to manage the external cache settings.

15. The system of claim 14, wherein the program on the server is further configured to cache the request after it has been processed.

* * * * *